Patented Sept. 5, 1933

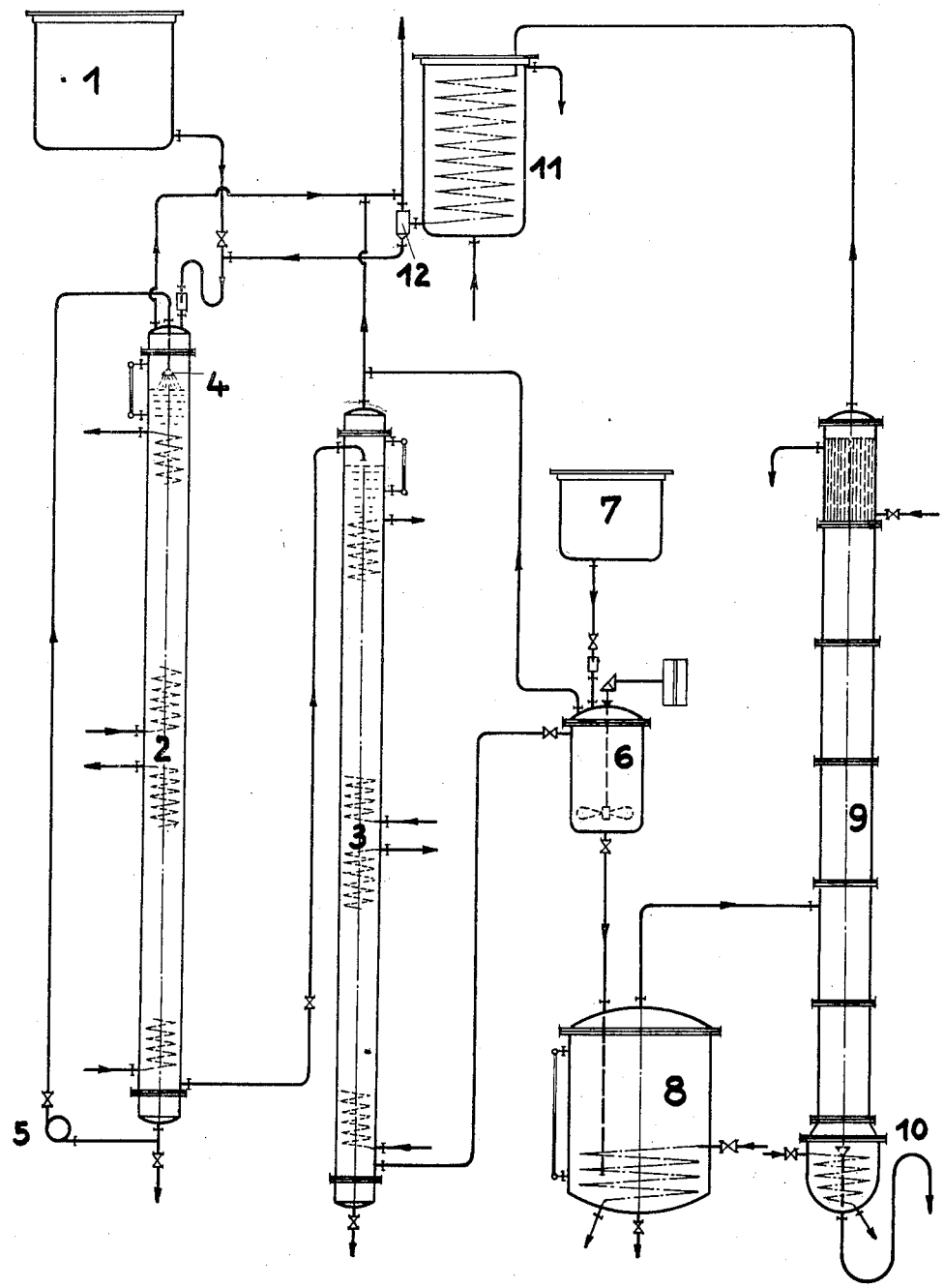

1,925,317

UNITED STATES PATENT OFFICE 1,925,317

PROCESS FOR MAKING UNSATURATED ALIPHATIC KETONES

Otto Fuchs, Constance, Baden, Germany, assignor to Deutsche Gold- und Silber-Scheideanstalt vormals Roessler, Frankfort-on-the-Main, Germany, a company of Germany Application April 1, 1932, Serial No. 602,586, and in Germany April 4, 1931

7 Claims. (Cl. 260—134)

The main object of my invention is to provide a practical method of directly producing pure unsaturated ketones of the formula given above from saturated ketones without isolating the corresponding keto-alcohols formed intermediately. More particularly my invention relates to converting acetone to mesityl oxide by a process avoiding the isolation of diacetone-alcohol which is formed as an intermediate product, this process of making mesityl oxide being preferably mentioned as an example of special commercial interest. In a similar manner other unsaturated ketones homologous to mesityl oxide may be obtained from the corresponding saturated ketones, as for instance ethyl-penten ketone ("methyl-3-heptene-3-on-5") from methyl ethyl ketone.

My invention is based on the fact unknown until now that the conversion of diacetone alcohol to mesityl oxide may be carried out in the presence of relatively large quantities of acetone and water, and that these latter substances do not at all disturb the reaction but even are very favorable to the formation of mesityl oxide.

Hitherto the production of mesityl oxide has mostly been effected by using a high percentage diacetone alcohol as the starting material, and by using dehydrating substances, especially acids, to act thereon in a known manner. It has also been attempted to arrive directly at mesityl oxide starting from acetone, but it has been impossible to substantially exclude secondary reactions, so that on the one hand the yields were quite moderate and, on the other hand, a product was obtained which, on account of impurities, tended to darken in color.

It was not to be foreseen that carrying out the dehydration of diacetone alcohol in the presence of acetone and water in quantities causing a considerable dilution of the reaction mixture could succeed in avoiding the disadvantages of methods formerly used, and that by such procedure the direct production of mesityl oxide from acetone would be rendered feasible. As a matter of fact, notwithstanding the dilution of the diacetone alcohol due to the presence of the acetone, which may amount to four to ten times the diacetone alcohol according to the condensation temperature, and notwithstanding the presence of fairly large quantities of water, the dehydration of the diacetone alcohol proceeds very rapidly and completely whilst, at the same time dark colored, high boiling point or undistillable by-products are only formed in quite small quantities which generally amount to less than 1% of the mesityl oxide produced in this manner. It is evident that the direct production of mesityl oxide from acetone according to my invention is to be preferred to those methods in which the intermediate product must be isolated, in so far as the direct process not only is much simpler relating to method and apparatus, but also is able to be carried out in a continuous manner.

Accordingly my invention may be realized for example, by treating acetone with an alkaline condensing agent in a known manner, heating the resulting mixture of diacetone alcohol and unconverted acetone with water and a certain quantity of an acid—e. g. oxalic acid or phosphoric acid—and further working up the mixture of vapors of acetone, water and mesityl oxide that passes off, in any manner discontinuously or continuously.

Preferably, the process is carried out by running the mixture of acetone and diacetone alcohol into a heated aqueous solution or suspension of such acids and separating the unconverted acetone vapor from the mixture of vapors that passes off and returning such acetone to the process. For example, the mixture of acetone and diacetone alcohol, with a content of about 11 to 23% of the latter (corresponding to condensation temperatures of between 20° and 0° C.) is continuously run into a vessel containing water and a weak acid—e. g. oxalic acid—and at the same time kept at such a temperature—e. g. 120° C.—that the resultant mesityl oxide and the unconverted acetone together with the water vapor continuously distil off. The mixture of vapors that passes off is advantageously subjected to a rectification so that the most volatile constituent, acetone, is continuously separated, liquefied and returned to the condensation stage. The water that distils off from the reaction vessel must be replaced by a corresponding supply such as may, for example, be effected in conjunction with the mixture of acetone and diacetone alcohol. In this way it is possible to keep the actual quantity of circulating acetone comparatively low in spite of the small percentage of conversion into diacetone alcohol and consequently into mesityl oxide and, if required, by employing an entirely closed apparatus, into which is fed only the quantity of acetone that is used up by formation of mesityl oxide, so as practically to avoid evaporation losses and the like.

It is possible in this manner to obtain readily mesityl oxide in yields of 95% of the acetone used and, notably, in the form of an extremely pure, hardly yellowish product which possesses the extraordinary property of becoming lighter in color in the light, rather than becoming darker and partially resinifying, as mesityl oxide preparations otherwise readily do.

The extraordinary economy of the process is especially evident in its employment for the homologous reactions—i. e. for the preparation of methyl-3-hepten-3-on-5 from methyl ethyl ketone. In this case, the corresponding keto-alcohol is produced (in accordance with the statements of Franke and Kohler, Lieb. Ann. 433, page 315) by the action of alkaline condensation agents only in quantities of 1 to 2%, so that the excess of the unaltered ketone circulating in the apparatus is at least 50 times that of the product. Notwithstanding this, it is possible also in this case, thanks to the present invention, especially when conducted continuously, to obtain 80 to 90% yields of a very pure unsaturated ketone.

The production of the mixture of ketone and keto-alcohol to be introduced into the reaction vessel may be effected discontinuously—for example, by running the acetone, which has been recovered and liquefied by cooling, into mixing vessels provided with cooling devices and into which small quantities of concentrated caustic soda or caustic potash solution—e. g., a few parts per thousand—are then stirred with good cooling, so that the temperature of the reaction at about the end of the condensation period still amounts to only 10° C., or with the employment of artificial cold, to 0 to 5° C. In such charges, the condensation will have proceeded up to the attainment of the equilibrium in about two to four hours, so that the water and the acid, such as oxalic acid or phosphoric acid, can then be added and the heating begun.

It is better, as already mentioned above, to run the mixture, that has, for example, already been mixed with water, continuously into a heated reaction vessel and to work up the mixture of the vapors correspondingly.

However, it is mostly more advantageous to carry out the process by effecting the condensation continuously by for example running the liquefied and cooled acetone through tubes or towers provided with cooling devices and by simultaneously introducing small quantities of alkali and regulating the velocity of flow in such a manner that on leaving this system of tubes or towers the equilibrium concentration of keto-alcohol is attained to some extent. In order to bring the alkali necessary for the condensation into action in such continuous devices, the towers may, for example, be filled with pieces of solid caustic soda, caustic potash, caustic lime or soda lime or caustic baryta or a solution of caustic soda or potash may be allowed to drop through the towers in the form of very fine drops. Also, at the entry into the tube system, caustic potash or soda solution can be admixed in the small quantity necessary by stirring, the mixing being facilitated by the employment of alcoholic solutions. In the case in which the condensation is carried out continuously, the apparatus can, as far as concerns the acetone circulation part, be made entirely closed with the exception of the breather necessary on the acetone cooler and of the inlet that is to be provided at the entrance into the condensation vessel for the purpose of adding acetone to replace the quantity of acetone that has been used up in the reaction. Consequently, notwithstanding the necessary circulating excess of acetone, the losses of the latter are practically zero and the yields are accordingly almost theoretical.

Advantageously, the period of action of very alkaline condensation agents, such as caustic potash or caustic soda solution, is limited to the time necessary for the approximate attainment of the keto-alcohol equilibrium, because, with a longer period of action, the liquid becomes brownish and finally dark and accordingly somewhat larger losses occur in the reaction vessel through the separation of highly condensed by-products. The yields are, however, in this way only reduced by a comparatively small amount. The production from a product dark-colored on account of prolonged action of alkali has no influence on the quality of the mesityl oxide itself, owing to the continuous removal together with acetone and water vapors. If, however, the apparatus cannot be kept in action so that the sufficiently condensed mixture immediately flows into the reaction vessel, it may be advantageous to effect the neutralization of the small quantities of the alkali contained therein by mixing with equivalent quantities of very dilute sulphuric acid or the like and thus to stop the further disadvantageous alteration of the condensation mixture. The preliminary neutralization is also advantageous in as much as in prolonged operations the acid concentration in the reaction vessel—i. e. the quantity of the available oxalic acid—remains more nearly constant than when it is partly used up by neutralization of the alkali that flows in with the condensation mixture. This acid, which is necessary for the neutralization, may, for example, be diluted with water to such an extent that the water vaporizing together with the acetone and the mesityl oxide from the reaction vessel is, at the same time, replaced and thus the liquid level in the reaction vessel is kept constant. The oily and tarry by-products formed therein occur in such a small quantity that they have to be removed only at long intervals.

The following is a record of two operations carried out in accordance with the invention:—

*Operation I.*—For the production of mesityl oxide from acetone an apparatus was taken comprising three successively arranged condensing tubes of a total volume of two litres, the first and third condensing tube being adapted to be cooled. The third tube was connected with a reaction vessel. The tubes were filled with pieces of soda lime which contained caustic soda and caustic lime in the proportion of 1 to 3. Before running the condensation product into the reaction vessel, it was mixed with a quantity of water slightly acidified with sulphuric acid and equal to about 10% of the product. The reaction vessel was charged with 100 gms. of oxalic acid and 200 gms. of water and was heated by an oil bath at about 120° C. Connected directly to the reaction vessel was a column electrically heated in the bottom portion and from the top of which the unconverted acetone distilled off; from the vessel placed below and heated with a burner the mixture of water and mesityl oxide was repeatedly drawn off. The acetone vapors from the column were condensed and passed back into the first condensing tube. Into this tube there flowed at the same time fresh acetone at the rate at which the formation of mesityl oxide proceeded—i. e. 180 gms. of acetone per hour. The hourly flow of acetone through the apparatus amounted to about 1.5 litres. On leaving the third tube, the liquid had, as the reading on a hydrometer showed, a diacetone alcohol content of from 9 to 11%. For filling the apparatus, 1.2 kgs. of acetone were necessary. In the course of three days 13.4 kgs. of acetone were introduced into the apparatus. The working up of the product gave, in addition to 0.3 kg. of acetone, 10.5 kgs. of pure mesityl oxide and 0.25 kg. of higher boiling point products which contained phorone. The yield from the acetone employed therefore amounted to 95% of the theoretical.

*Operation II.*—For the production of methyl-3-hepten-3-on-5 from methyl ethyl ketone, a similar apparatus was employed with two condensing tubes which were filled with pieces of caustic soda. Since the methyl-ethyl-ketone distils wet, two drying tubes were inserted before the condensing tubes. Owing to insufficient length of the column, the separation of the unchanged methyl-ethyl-ketone was not as complete as in the case of acetone. The temperature in the reaction vessel first rose gradually to the point at which the condensation product increased and finally reached 110° C. In an operation lasting six days, a total of 1230 gms. of methyl-ethyl-ketone were introduced into the apparatus. In the working up of the product, there were obtained 421 gms. of unchanged methyl-ethyl-ketone and, by vacuum distillation at 55 mms., there were obtained 40 gms. of first runnings up to 80° C. and 576 gms. of the unsaturated ketone from 80 to 86° C. Since the first runnings can be further used in the process, a yield of 85.5% is reckoned on the methyl-ethyl-ketone used.

The accompanying drawing represents an apparatus for the technical carrying out of the process. However, in accordance with the foregoing statements, the carrying out of the invention is in no way restricted to this form of the apparatus.

Fresh acetone is introduced into the process from the stock container 1. The condensation takes place in two towers 2 and 3 which are furnished with cooling devices, inspection glasses, etc. Owing to the fact that the second tower is placed somewhat lower than the first, the liquid flows of itself from the first into the second tower. By means of a distributing device 4, the concentrated caustic potash solution circulated by the pump 5 is introduced into the first tower in the form of very fine drops. It collects at the bottom of the tower and again flows to the pump.

From the tower 3 the mixture of acetone and diacetone alcohol enters a mixing vessel 6 into which acidified water flows at the same time from a stock container 7. The neutralized mixture runs into the reaction vessel 8 containing a certain stock of suited acid, e. g. oxalic or phosphoric acid. From the latter, the mixture of vapors that goes off passes into the column 9 from which a mixture of mesityl oxide and water is drawn off at 10, whilst the acetone distils off free from water at the top and is then liquefied in the condenser 11. After passing through a breather 12, to which the two towers and the mixing vessel 6 are also advantageously connected, the condensed acetone together with fresh acetone from the container 1 flows into the tower 2.

As to the preparation of the mixture of the keto-alcohol with the saturated ketone the technical process is not to be restricted to the special procedure described in the examples which are given above, but any other, also discontinuous processes of preparing this mixture from the saturated ketone, e. g. acetone, may be applied.

The mixture of water and mesityl oxide that remains behind after the evaporation of the acetone can be worked up in a known manner as for example, in a manner similar to the treatment of wet butyl alcohol or amyl alcohol. Two layers are formed by distillation, a lower aqueous layer, which contains in solution about 3% of mesityl oxide, and an upper oily layer which represents mesityl oxide with about 5% of water. This upper layer is, for example, in the discontinuous working up by distillation, returned into the distillation vessel until no more water is separated off, whereupon the anhydrous mesityl oxide can be distilled over. It is possible to proceed in a corresponding manner in the continuous working up of the mixture of mesityl oxide and water which can be carried out directly after the continuous separation of the acetone.

I claim:—

1. The process of producing unsaturated ketones of the type $C_{2n}H_{4n-2}O$ directly from saturated ketones of the type $C_nH_{2n}O$ which comprises treating the saturated ketone with an alkaline condensing agent in a known manner in order to get a partial conversion of the saturated ketone to the corresponding keto-alcohol, subjecting the resulting liquid comprising the keto-alcohol diluted by the excess of unaltered ketone, in the presence of water, to the action of an acid the quantity of which is larger than the quantity equivalent to the alkali contained in the liquid, distilling this mixture, separating the unconverted saturated ketone in a substantially waterfree condition, returning it in condensed form to the starting material and collecting the unsaturated ketone.

2. The process of producing unsaturated ketones of the type $C_{2n}H_{4n-2}O$ directly from saturated ketones of the type $C_nH_{2n}O$ which comprises treating the saturated ketone with an alkaline condensing agent in the cold, in order to get a partial conversion of the saturated ketone to the corresponding keto-alcohol, subjecting the resulting liquid comprising the keto-alcohol diluted by the excess of unaltered ketone, in the presence of water, to the action of an acid the quantity of which is larger than the quantity equivalent to the alkali contained in the liquid, distilling this mixture, separating the unconverted saturated ketone in a substantially waterfree condition, returning it in condensed form to the starting material and collecting the unsaturated ketone.

3. The process of producing unsaturated ketones of the type $C_{2n}H_{4n-2}O$ directly from saturated ketones of the type $C_nH_{2n}O$ which comprises treating the saturated ketone with an alkaline condensing agent in the cold, in order to get a partial conversion of the saturated ketone to the corresponding keto-alcohol, subjecting the resulting liquid comprising the keto-alcohol diluted by the excess of unaltered ketone to the action of an acid, the quantity of which is larger than the quantity equivalent to the alkali contained in the liquid, adding water to this mixture, distilling it, separating the unconverted saturated ketone in a substantially water-free condition, returning it in condensed form to the starting material and collecting the unsaturated ketone.

4. The process of producing unsaturated ketones of the type $C_{2n}H_{4n-2}O$ directly from saturated ketones of the type $C_nH_{2n}O$ which comprises treating the saturated ketone with an alkaline condensing agent in the cold, in order to get a partial conversion of the saturated ketone to the corresponding keto-alcohol, running the resulting liquid comprising the keto-alcohol diluted by the excess of unaltered ketone into a heated vessel containing acid in the form of an aqueous suspension or solution, distilling the resulting mixture, separating the unconverted saturated ketone in a substantially water free condition, returning it in condensed form to the starting material and collecting the unsaturated ketone.

5. The process of producing unsaturated ketones of the type $C_{2n}H_{4n-2}O$ directly from saturated ketones of the type $C_nH_{2n}O$ which comprises treating the saturated ketone with an alkaline condensing agent in the cold, in order to get a partial conversion of the saturated ketone to the corresponding keto-alcohol, subjecting the resulting liquid comprising the keto-alcohol diluted by the excess of unaltered ketone to the action of an acid, the quantity of which is larger than the quantity equivalent to the alkali contained in the liquid, adding water to this mixture, distilling it, separating the unconverted saturated ketone in a substantially waterfree condition, returning it in condensed form, together with an amount of fresh saturated ketone corresponding to the amount of unsaturated ketone produced, to the starting material and collecting the unsaturated ketone.

6. The process of producing unsaturated ketones of the type $C_{2n}H_{4n-2}O$ directly from saturated ketones of the type $C_nH_{2n}O$ which comprises treating the saturated ketone with an alkaline condensing agent in the cold, in order to get a partial conversion of the saturated ketone to the corresponding keto-alcohol, subjecting the resulting liquid comprising the keto-alcohol diluted by the excess of unaltered ketone to the action of an acid, the quantity of which is larger than the quantity equivalent to the alkali contained in the liquid, adding water to this mixture, distilling it, separating the unconverted saturated ketone in a substantially waterfree condition, returning it in condensed form, together with an amount of fresh saturated ketone corresponding to the amount of unsaturated ketone produced, to the starting material, vaporizing the collected mixture of unsaturated ketone and water, allowing the resulting condensate to separate into an aqueous layer containing some dissolved unsaturated ketone and an upper layer containing little water, and treating the latter layer in any known manner to effect complete dehydration of the unsaturated ketone.

7. The process of producing mesityl oxide directly from acetone which comprises treating the latter with an alkaline condensing agent in the cold, in order to get a partial conversion of the acetone to the corresponding keto-alcohol, subjecting the resulting liquid comprising the keto-alcohol diluted by the excess of unaltered acetone to the action of an acid, the quantity of which is larger than the quantity equivalent to the alkali contained in the liquid, adding water to this mixture, distilling it, separating the unconverted acetone in a substantially waterfree condition, returning it in condensed form, together with an amount of fresh acetone corresponding to the amount of mesityl oxide produced, to the starting material, vaporizing the collected mixture of mesityl oxide and water, allowing the resulting condensate to separate into an aqueous layer containing some dissolved mesityl oxide and an upper layer containing little water, and treating the latter layer in any known manner to effect complete dehydration of the mesityl oxide.

OTTO FUCHS.